UNITED STATES PATENT OFFICE.

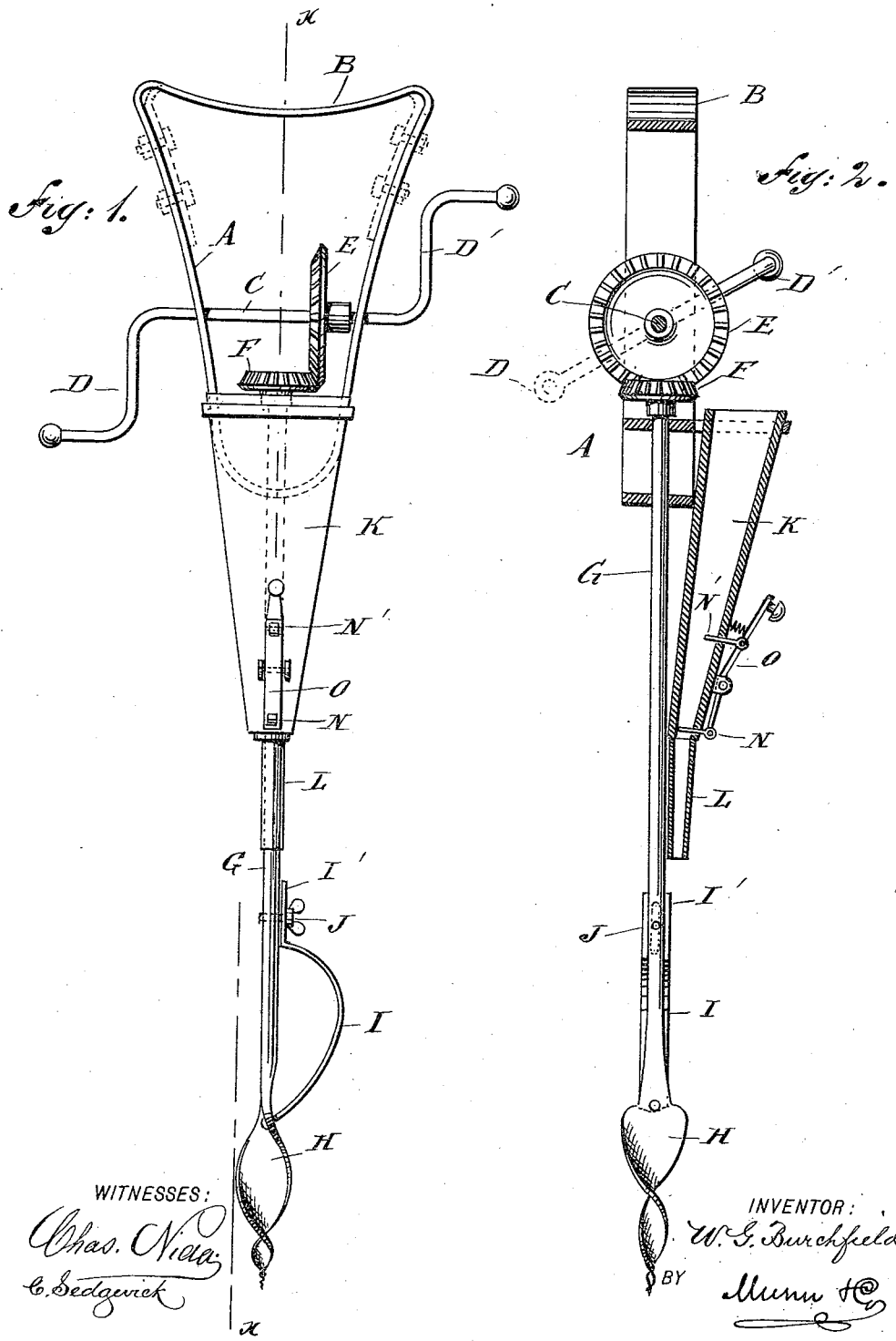

WILMER G. BURCHFIELD, OF ALTUS, ARKANSAS.

SEED-PLANTER.

SPECIFICATION forming part of Letters Patent No. 437,563, dated September 30, 1890.

Application filed June 25, 1890. Serial No. 356,603. (No model.)

*To all whom it may concern:*

Be it known that I, WILMER G. BURCHFIELD, of Altus, in the county of Franklin and State of Arkansas, have invented a new and Improved Seed-Planter, of which the following is a full, clear, and exact description.

The invention relates to hand implements for gardeners' and farmers' use; and its object is to provide a new and improved seed-planter which is simple and durable in construction and specially designed for conveniently and rapidly planting seed in hills in the garden.

The invention consists of a drill-rod mounted to turn and provided with a bit and a seed-box having its spout arranged alongside the said drill-rod to drop the seed into the opening made by the bit.

The invention also consists in certain parts and details and combinations of the same, as will be described hereinafter, and then pointed out in the claims.

Reference is to be had to the accompanying drawings, forming a part of this specification, in which similar letters of reference indicate corresponding parts in both the figures.

Figure 1 is a front view of the improvement, and Fig. 2 is a transverse section of the same on the line $x\ x$ of Fig. 1.

The improved seed-planter is provided with a suitably-constructed frame A, supporting on its upper end a breast-plate B, which may be either stationary, as shown in full lines in Fig. 1, or adjustable, as illustrated in dotted lines in said Fig. 1, to adjust the frame to the height of the person using the implement.

In the main frame A is mounted to turn in suitable bearings the shaft C, carrying on each end a crank-arm D or D', said crank-arms being arranged opposite each other, as is plainly shown in Fig. 1. On the shaft C is secured a bevel gear-wheel E, meshing into a pinion F, secured on the upper end of the drill-rod G, arranged vertically and mounted to turn in suitable bearings in the frame A.

On the lower end of the drill-rod G is formed or secured a bit H, adapted to bore an opening in the ground for the admission of the seed. Above the bit H is arranged a curved plate I, fastened at its lower end in the upper part of the said bit H or on the lower part of the drill-rod, the upper end of the said plate being provided with a slotted flange I', fitting onto the shank of the drill-rod G and secured thereto by a suitable screw J, screwing in the drill-rod. The plate I is semi-egg shape, as is plainly shown in Fig. 1, and serves to loosen the ground around the hill, so that the seed planted in the hill readily germinates.

On the main frame A is secured a seed-box K, provided on its lower end with a spout L, arranged in line with the drill-rod G, so that the seed discharged through the said spout readily passes into the opening made by the bit H. In the lower end of the seed-box K are arranged two valves N and N', one located above the other and pivotally connected at their outer ends with a spring-pressed lever O, arranged in such a manner that when one valve is closed the other is open, and vice versa.

The operation is as follows: The seed to be planted is placed into the seed-box K, which has its lower end closed by the valve N, pressed inward by the spring-pressed lever O, the upper valve N' being open. The operator places the machine in a vertical position over a spot in which the seed is to be planted, then presses on the breast-plate B, and at the same time turns the crank-arms D and D', so as to rotate the shaft C, which by the gear-wheel E and the pinion F rotates the drill-rod G, so that the bit H bores an opening in the ground to any depth, the plate I loosening the ground on top around the opening made by the bit. When the opening has been made, the operator presses the lever O, so that the upper valve N' closes and retains its seat in the upper part of the seed-box, while the seed below the said valve N' passes out through the open valve N into the spout L, which guides the seed into the opening made by the bit. As soon as the operator releases the pressure on the spring-pressed lever O, the lower valve N again closes and the upper valve N' opens, so that the space in the seed-box between the said valves is again filled with seed to be discharged in the next hole, as above described. By changing the distance between the valves N and N' a greater or less quantity of seed may be dropped into the hole.

Having thus described my invention, what I claim as new, and desire to secure by Letters Patent, is—

1. In the seed-planter, the combination, with a drill-rod mounted to turn and carrying a bit, of a seed-box having its spout arranged alongside the drill-rod to drop the seed into the opening made by the said bit, substantially as shown and described.

2. A seed-planter comprising a frame, a drill-rod mounted to turn in the said frame and provided with a bit, and a seed-box secured on the said frame and having its spout arranged alongside the said drill-rod to drop the seed into the opening made by the bit, substantially as shown and described.

3. A seed-planter comprising a frame, a drill-rod mounted to turn in the said frame and provided with a bit, a seed-box secured on the said frame and having its spout arranged alongside the said drill-rod to drop the seed into the opening made by the bit, and a plate secured to the said drill-rod above the said bit to loosen the ground, substantially as shown and described.

4. A seed-planter comprising a frame, a drill-rod mounted to turn in the said frame and provided with a bit, a seed-box secured on the said frame and having its spout arranged alongside the said drill-rod to drop the seed into the opening made by the bit, and valves arranged in the said seed-box to discharge at the proper moment and to regulate the amount of seed to be planted, substantially as shown and described.

5. A seed-planter comprising a main frame, a breast-plate held on the said frame, a drill-rod mounted to turn in the said frame and provided with a bit, a seed-box secured to the frame and having its spout arranged alongside of the drill-rod, and means, substantially as described, for turning the said drill-rod in the said frame, as set forth.

6. A seed-planter comprising a main frame, a breast-plate held on the said frame, a drill-rod mounted to turn in the said frame and provided with a bit, means, substantially as described, for turning the said drill-rod in the said frame, and a seed-box provided with valves and secured on the said main frame and adapted to discharge by its spout into the opening made by the said drill-rod, as set forth.

WILMER G. BURCHFIELD.

Witnesses:
W. F. AUSTIN,
R. L. BOYETT.